US010676801B2

(12) United States Patent
Campbell et al.

(10) Patent No.: US 10,676,801 B2
(45) Date of Patent: Jun. 9, 2020

(54) STEEL COMPOSITIONS, METHODS OF MANUFACTURE AND USES IN PRODUCING RIMFIRE CARTRIDGES

(71) Applicant: GREER STEEL COMPANY, Dover, OH (US)

(72) Inventors: Douglas B. Campbell, Waikoloa, HI (US); Todd Daenzer, New Philadelphia, OH (US)

(73) Assignee: Greer Steel Company, Dover, OH (US)

( * ) Notice: Subject to any disclaimer, the term of this patent is extended or adjusted under 35 U.S.C. 154(b) by 797 days.

(21) Appl. No.: 14/971,233

(22) Filed: Dec. 16, 2015

(65) Prior Publication Data

US 2016/0186281 A1    Jun. 30, 2016

Related U.S. Application Data

(60) Provisional application No. 62/092,359, filed on Dec. 16, 2014.

(51) Int. Cl.
| | | |
|---|---|---|
| *C21D 1/00* | (2006.01) | |
| *C21D 9/16* | (2006.01) | |
| *C22C 38/58* | (2006.01) | |
| *C22C 38/44* | (2006.01) | |
| *C22C 38/42* | (2006.01) | |

(Continued)

(52) U.S. Cl.
CPC .............. *C21D 9/16* (2013.01); *C21D 6/004* (2013.01); *C21D 6/005* (2013.01); *C21D 6/008* (2013.01); *C21D 8/0205* (2013.01); *C21D 8/0236* (2013.01); *C21D 8/0247* (2013.01); *C22C 38/002* (2013.01); *C22C 38/02* (2013.01); *C22C 38/06* (2013.01); *C22C 38/42* (2013.01); *C22C 38/44* (2013.01); *C22C 38/58* (2013.01); *C23C 2/02* (2013.01); *C23C 2/06* (2013.01);

(Continued)

(58) Field of Classification Search
CPC ...... C21D 9/46; C21D 8/0205; C21D 8/0236; C21D 8/0436; C21D 8/1266; C23C 2/06
See application file for complete search history.

(56) References Cited

U.S. PATENT DOCUMENTS

| 2,462,851 A | 3/1949 | Fawcett et al. | |
|---|---|---|---|
| 5,203,928 A * | 4/1993 | Inokuti | C21D 8/1233 |
| | | | 148/111 |

(Continued)

FOREIGN PATENT DOCUMENTS

| RU | 2229091 C2 | 5/2004 |
|---|---|---|
| RU | 2397433 C1 | 8/2010 |

(Continued)

OTHER PUBLICATIONS

International Searching Authority, International Search Report and the Written Opinion for International Application No. PCT/US2015/065980, dated Jul. 5, 2016.

*Primary Examiner* — Erin B Saad
(74) *Attorney, Agent, or Firm* — Eckert Seamans Cherin & Mellott, LLC; Carol A. Marmo

(57) ABSTRACT

The present invention relates generally to steel compositions, methods of manufacturing the compositions and using the compositions to produce rimfire ammunition cartridges. The steel compositions for use in the rimfire cartridges are processed through cold-rolling and annealing steps to create suitable physical properties.

4 Claims, 7 Drawing Sheets

(51) Int. Cl.
- *C22C 38/06* (2006.01)
- *C22C 38/02* (2006.01)
- *C22C 38/00* (2006.01)
- *C21D 8/02* (2006.01)
- *C21D 6/00* (2006.01)
- *C23C 2/26* (2006.01)
- *C23C 2/06* (2006.01)
- *C23C 2/02* (2006.01)
- *F42B 5/32* (2006.01)
- *F42B 33/00* (2006.01)

(52) U.S. Cl.
CPC .................. *C23C 2/26* (2013.01); *F42B 5/32* (2013.01); *F42B 33/001* (2013.01)

(56) References Cited

U.S. PATENT DOCUMENTS

| | | | | |
|---|---|---|---|---|
| 6,562,473 | B1* | 5/2003 | Okabe | C21D 8/12 148/100 |
| 2005/0247383 | A1* | 11/2005 | Utsumi | C21D 8/00 148/533 |
| 2009/0038718 | A1* | 2/2009 | Dotsch | C21D 8/02 148/530 |
| 2014/0230971 | A1 | 8/2014 | Kawasaki et al. | |
| 2014/0242414 | A1* | 8/2014 | Minami | C23C 2/02 428/659 |
| 2014/0360632 | A1* | 12/2014 | Hasegawa | C21D 9/46 148/533 |

FOREIGN PATENT DOCUMENTS

| | | |
|---|---|---|
| RU | 2440550 C1 | 1/2012 |
| RU | 2502821 C1 | 12/2013 |
| WO | 2007134855 A1 | 11/2007 |

\* cited by examiner

40    Apply Intermediate Thickness Steel
(Either as hard cold rolled, or dual phase annealed)
42    Batch Anneal and Cool
44    Cold Roll to Intermediate Thickness (About 30-70%)
46    Batch Anneal and Cool
48    Cold Roll to Final Thickness (20-35%)
50    Batch Anneal and Cool
52    Continuous Plate
54    Form Rimfire Cartridge
FIG. 3C

Process Route #1
60 Pickle (De-scale)
(Can be done by melting mill or purchaser)
62   Pickled Hot Rolled High Strength Steel (0.090" Thickness, Approx.)
64   Cold Roll to Finished Gage
66   Continuous Anneal
68   Rapid Cool
70   Continuous Plate
72   Form Rimfire Cartridge
FIG. 4

STEEL COMPOSITIONS, METHODS OF MANUFACTURE AND USES IN PRODUCING RIMFIRE CARTRIDGES

CROSS-REFERENCE TO RELATED PATENT APPLICATIONS

This patent application claims the benefit of U.S. Provisional Patent Application No. 62/092,359, entitled "Steel Compositions, Methods of Manufacture and Uses in Producing Rimfire Cartridges", filed on Dec. 16, 2014, the contents of which are incorporated herein by reference.

BACKGROUND OF INVENTION

Field of Invention

The invention relates generally to steel compositions, methods of manufacturing the compositions and uses of the compositions to produce rimfire ammunition cartridges.

Description of Related Art

In general, rimfire ammunition cartridges are sufficiently strong to withstand pressures created by ignition of a propellant, while being sufficiently elastic to permit extraction from the chamber or barrel of a firing device after firing. Brass has traditionally been used for this type of ammunition. Its physical properties allow for the manufacture of rimfire cartridge cases that satisfy the strength and elasticity requirements. Brass is corrosion resistant, formable and highly elastic. Thus, the use of brass results in little or no problems when extracting the cartridge from the firearm after firing. Brass work-hardens to an extent that provides adequate strength to withstand the explosive force of the powder charge with minimal failures of the cartridge sidewalls. It is relatively soft and therefore, can be formed with minimal tool wear in manufacturing. Thus, it has been shown that brass is a preferred material in the manufacture of rimfire ammunition cartridges. However, one disadvantage of brass is its cost; brass is typically expensive and its price has been known to fluctuate significantly.

In developing a less expensive metal as an alternative, steel has been considered as a replacement for brass. Advantageously, stress corrosion cracking and reaction with primers and powders are not problems associated with the use of steel. Although, one disadvantage is that steel does not have the same elastic recovery as brass. As a result, there are extraction concerns associated with the removal of steel cartridges from the chamber or barrel of the firearm after firing. For example, with the use of low carbon steels, such as C1008/1010, extraction problems may be severe due to the elasticity of lower carbon steel being much less as compared to brass.

FIG. 1 is a plot of stress-strain curves for brass and steel, and shows, elastic strain for steel 1, elastic strain for brass 2, total strain to failure for steel 3, total strain to failure for brass 4, yield strength for brass 5, tensile strength for brass 6, yield strength for steel 7, tensile strength for steel 8, and slope 9. Young's modulus, e.g., elastic recovery, for brass and steel can be determined based on the slope of each of the stress-strain curves in the elastic region. The slope of the curve for brass is one-half that of steel, as shown in FIG. 1. Young's modulus for brass is approximately $15\times10^6$ psi while the modulus for steel is approximately from $29\times10^6$ to $30\times10^6$ psi. In FIG. 1, slope 9 is calculated as stress divided by strain in the elastic region. Elastic strain of steel 1 and elastic strain of brass 2 are shown in FIG. 1. The elastic recovery for brass is twice that of steel. Thus, brass has almost twice the elasticity as steel for the equivalent stress level. As a result, a brass cartridge when fired will expand in diameter due to the internal pressure and essentially seal the internal diameter of the chamber. After firing, the brass cartridge will then "shrink" in diameter such that its diameter is less than the internal diameter of the chamber and therefore, the cartridge can be easily removed from the chamber.

FIG. 2 is a schematic showing a portion of a firing device, including a cartridge head 11 and a cartridge sidewall 12, positioned within a chamber 13 of a barrel 14 of the firing device and an extractor 15 for use in extracting the cartridge 11,12 from the chamber 13 after firing the firing device. Further, FIG. 2 includes a bolt 10, firing pin 16, and a sidewall 17 sealing the chamber.

Since the elasticity and elastic recovery of steel is significantly less than brass, the diameter of a typical low carbon steel cartridge will expand to seal the chamber upon firing of a firing device; however, after firing, the diameter of the low carbon steel cartridge will shrink less, e.g., only half as much as brass because (as shown in FIG. 1) brass has almost twice the elasticity of steel. The amount by which the diameter of the steel cartridge shrinks may not be sufficient to allow the cartridge to be easily extracted from the chamber after firing. As a result, the cartridge can lodge in the chamber of the barrel of the firing device.

Additionally, as shown in FIG. 2, one or more sidewall splits 18 (which is exaggerated) may occur with low carbon steel due to the material, even after forming and work hardening, not being sufficiently strong or ductile to withstand the internal explosion experienced by the cartridge upon firing of the device. Without intending to be bound by any particular theory, it is believed that in order for steel to elastically recover to the same extent as brass, the steel should have about twice the yield strength as brass in the drawn sidewall of the cartridge (after work hardening in forming). However, it is very likely that yield strength values lower than twice that of steel (in the cartridge sidewalls) would be sufficient to allow for acceptable extraction upon firing.

Alternatively, higher carbon steels could be used to increase the strength of the cartridge to overcome the aforementioned problems; however, there are anticipated problems relating to forming and tool wear, as well as the steel likely being too hard for the firing pin to deform the rim of the cartridge. Generally, rimfire cartridges have rims that are deformable by the firing pin as a mechanism to ignite the priming powder, which is contained within the case of the cartridge.

Heat treating steel cartridge cases, which have already been formed, can reduce tool wear and increase strength. U.S. Pat. No. 2,373,921 to Snell and U.S. Pat. No. 2,698,268 to Lyon disclose a method of forming steel cartridge cases requiring a heat treatment or annealing step after the case is formed. However, heat treatments on a batch of small parts, like cases for rimfire ammunition, does not produce uniform results through all of the parts. Unlike Snell or Lyon, the steel rimfire cartridge of the present invention requires no further treatments after the case is formed. In addition, neither Snell nor Lyon contemplates the use of steel cases formed by their methods for use in rimfire ammunition, but rather apply the invention to the production of center fire ammunition.

Thus, there is a need in the art to design and develop a metal or metal alloy for use in manufacturing rimfire ammunition cartridges that is a replacement for the typical brass material that is known in the art.

SUMMARY OF INVENTION

The present invention relates generally to steel compositions and methods of processing the steel compositions for producing steel-cased rimfire cartridges. In one aspect, the invention provides a steel composition for rimfire ammunition cartridges. The composition includes from about 0.03 to about 0.18 weight percent carbon, from about 0.15 to about 1.60 weight percent silicon, from about 0.60 to about 2.50 weight percent manganese, from greater than 0 to about 0.025 weight percent phosphorus, from greater than 0 to about 0.025 weight percent sulfur and from about 0.20 to about 0.08 weight percent aluminum, based on the total weight percent of the composition.

The composition can further include one or more metal elements selected from the group consisting of cobalt, columbium, chromium, copper, molybdenum, nickel, titanium, vanadium, zirconium and mixtures and alloys thereof. The one or more of the metal elements present in the composition can constitute typically no more than about 0.22 weight percent, based on total weight of the composition.

In certain embodiments, the composition can include from about 0.05 to about 0.13 weight percent carbon, from about 0.15 to about 0.50 weight percent silicon, from about 0.70 to about 2.50 weight percent manganese, about 0.025 weight percent phosphorus, about 0.025 percent sulfur, from about 0.20 to about 0.08 weight percent aluminum and less than about 0.22 weight percent of the one or more metal elements, based on the total weight of the composition.

In certain other embodiments, the composition can include from about 0.16 to about 0.18 weight percent carbon, from about 1.25 to about 1.55 weight percent silicon, from about 1.9 to about 2.1 weight percent manganese, about 0.02 weight percent phosphorus, about 0.02 percent sulfur, from about 0.025 to about 0.055 weight percent aluminum, less than about 0.06 weight percent copper, less than about 0.04 weight percent nickel, less than about 0.06 weight percent chromium and less than about 0.02 weight percent molybdenum, based on the total weight of the composition.

In certain other embodiments, the composition can include from about 0.126 to about 0.154 weight percent carbon, from about 0.395 to about 0.605 weight percent silicon, from about 1.75 to about 1.95 weight percent manganese, about 0.02 weight percent of phosphorus, about 0.005 percent sulfur, from about 0.02 to about 0.06 weight percent aluminum, less than about 0.06 weight percent copper, less than about 0.04 weight percent nickel, less than about 0.06 weight percent chromium and less than about 0.02 weight percent molybdenum, based on the total weight of the composition.

In another aspect, the invention provides a method of processing a steel composition for a rimfire cartridge. The method includes obtaining a steel composition having an original thickness, cold rolling the steel composition to reduce the original thickness by at least 70%, to produce a cold rolled steel composition having an intermediate thickness, performing a first annealing and subsequent cooling of the steel composition with an intermediate thickness to produce an annealed intermediate steel composition, cold rolling the annealed intermediate steel composition to a thickness that is reduced about 20% to about 35% from the intermediate thickness of the intermediate steel composition to produce a steel composition having a final thickness, performing a second annealing and subsequent cooling of the steel composition having a final thickness to produce a final annealed steel composition having a final thickness, and continuous plating the final annealed steel material having a final thickness.

In certain embodiments, the first and second annealing steps are conducted as a batch process. In other embodiments, the first and second annealing steps are conducted as a continuous process.

In certain embodiments, the continuous plating step can be performed prior to the second cold rolling step. This continuous plating step can be in addition to or in place of the continuous plating step performed after the second annealing and cooling step. The continuous plating can include zinc, brass or combinations and alloys thereof.

The steel composition obtained can have an original thickness of about 0.090 inches. Further, the steel composition obtained can be in a form selected from hot roll, hot roll that is pickled and oiled, and dual phase cold roll. The steel composition obtained can be at least partially reduced such that the reduction in the first cold rolling step may be modified or eliminated. In certain embodiments, the steel composition obtained is an intermediate cold rolled composition. In other embodiments, the steel composition obtained is a dual phase cold rolled composition. In these embodiments, an initial annealing and cooling step is performed prior to the first cold rolling step.

The method of forming the rimfire cartridge can be selected from a cup, draw and head process, and a progressive die and head process.

In another aspect, the invention provides a method of processing a steel composition to form a rimfire cartridge. The method includes obtaining a steel composition having an original thickness, cold rolling the steel composition to produce a steel composition having a final thickness, annealing and subsequently cooling the steel composition having a final thickness to produce a final annealed steel composition having a final thickness, and continuous plating the final annealed steel composition having a final thickness.

The rimfire cartridge can include a case composed of the steel composition recited above, having a first end and a second end, a rim formed on the first end of the case, a projectile pressed into the second end of the steel case, a priming compound contained within the rim, and a propellant contained within the case.

BRIEF DESCRIPTION OF THE DRAWINGS

FIGS. 3A, 3B and 3C generally show a batch process in accordance with the invention that is used to treat or process steel and form it into a rimfire cartridge case.

DETAILED DESCRIPTION OF THE INVENTION

Figure 1:
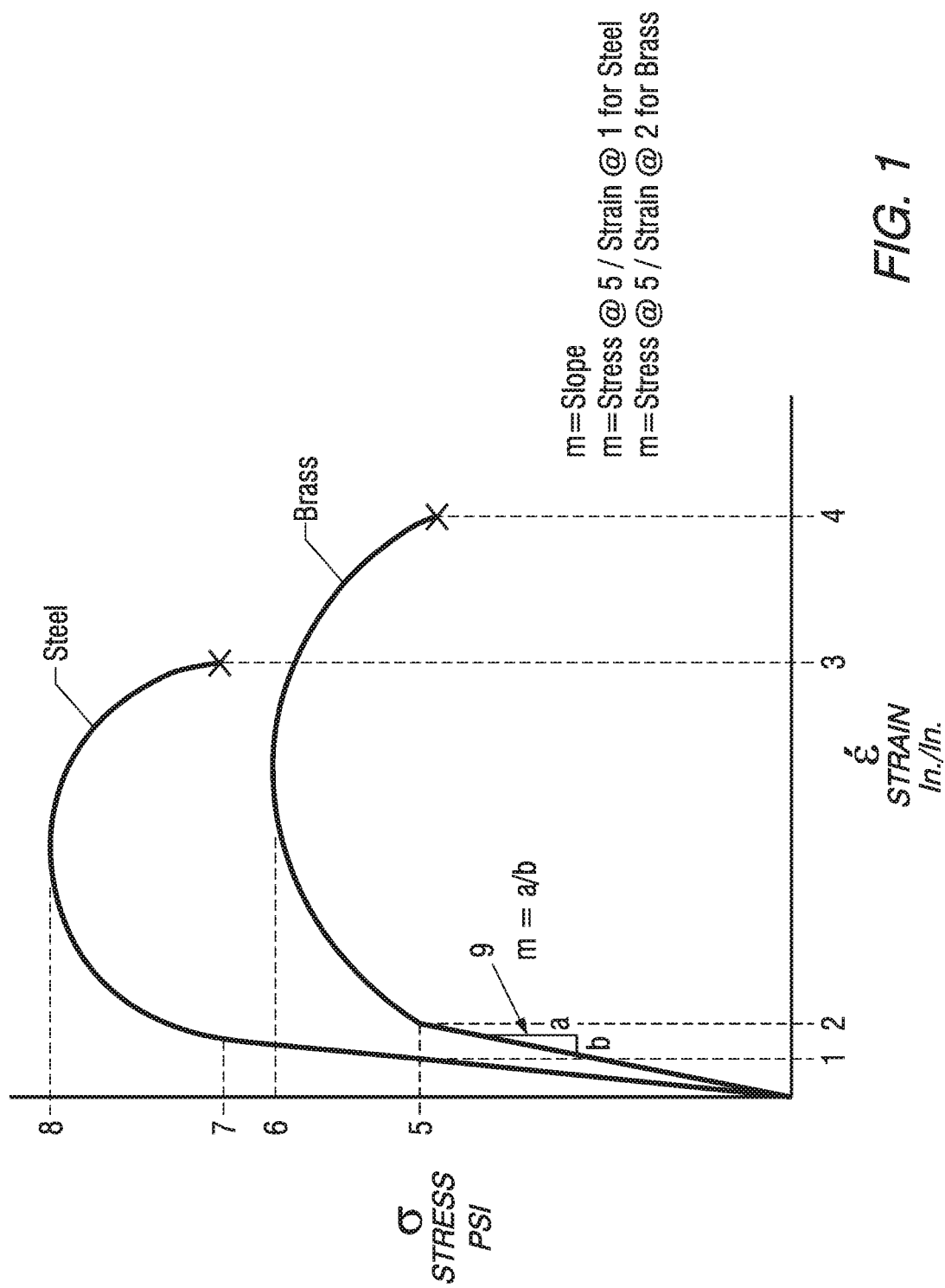
FIG. 1 is a plot showing a stress/strain curve for each of brass and steel.
Figure 2:
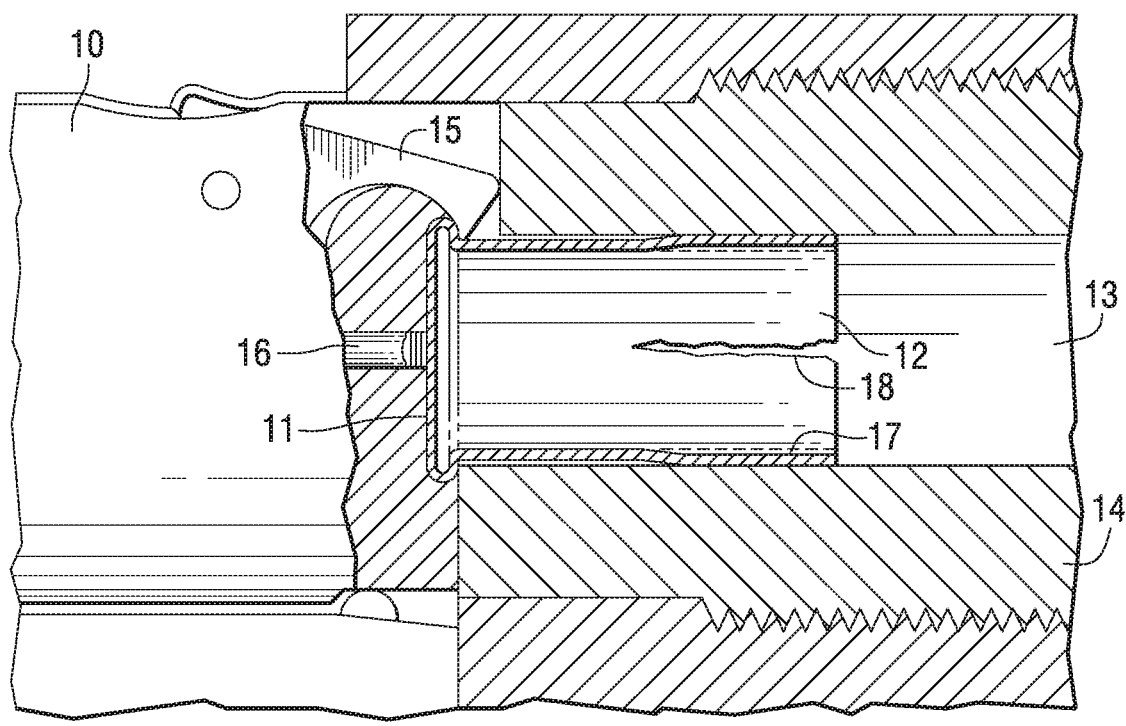
FIG. 2 is a schematic showing a rimfire ammunition cartridge inside a chamber of a firing device.

Rimfire cartridges are generally known in the art and, they are typically composed of brass and manufactured by conventional methods employed for processing the cartridges.

The methods include the cup, draw and head method, or, alternatively, the progressive die and head method. The invention provides steel compositions as replacements for brass in the manufacture of rimfire ammunition cartridges and, in particular, for use in .22 caliber firing devices. The invention also provides methods of processing and treating, e.g., annealing, the steel compositions such that they produce rimfire cartridges that demonstrate one or more of the following properties:

relatively soft in the rim such that the firing pin will deform the material enough to ignite the primer upon firing of a firing device;

work-hardened to a level approaching twice that of typical brass (which may be somewhat less in the batch annealed product) in order to achieve sufficient elastic recovery to prevent problems associated with extracting the cartridge from the chamber in the barrel of the firing device;

formable enough to produce the cartridge; and sufficiently strong and ductile to reduce or preclude failures of the cartridge side walls, e.g., splits, upon firing of the firing device.

The steel compositions produced in accordance with the invention can vary and can depend on the particular steel manufacturer and the amount of alloy components employed. In certain embodiments, the steel compositions include from about 0.03 to about 0.18 weight percent carbon, from about 0.15 to about 1.60 weight percent silicon, from about 0.60 to about 2.50 weight percent manganese, from greater than 0 to about 0.025 weight percent phosphorus, from greater than 0 to about 0.025 weight percent sulfur, and from about 0.02 to about 0.08 weight percent aluminum, based on the total weight percent of the composition. In addition, the compositions may include one or more metal elements selected from the group consisting of cobalt, columbium, chromium, copper, molybdenum, nickel, titanium, vanadium, zirconium and mixtures and alloys thereof. In certain embodiments, when one or more of these metal elements are present in the compositions, the one or more metal elements typically constitute no more than about 0.22 weight percent, based on the total weight of the composition.

In certain embodiments, the composition can include from about 0.05 to about 0.13 weight percent carbon, from about 0.15 to about 0.50 weight percent silicon, from about 0.70 to about 2.50 weight percent manganese, about 0.025 weight percent phosphorus, about 0.025 percent sulfur, from about 0.20 to about 0.08 weight percent aluminum and less than about 0.22 weight percent of the one or more metal elements, based on the total weight of the composition.

In certain other embodiments, the composition can include from about 0.16 to about 0.18 weight percent carbon, from about 1.25 to about 1.55 weight percent silicon, from about 1.9 to about 2.1 weight percent manganese, about 0.02 weight percent phosphorus, about 0.02 percent sulfur, from about 0.025 to about 0.055 weight percent aluminum, less than about 0.06 weight percent copper, less than about 0.04 weight percent nickel, less than about 0.06 weight percent chromium and less than about 0.02 weight percent molybdenum, based on the total weight of the composition.

In certain other embodiments, the composition can include from about 0.126 to about 0.154 weight percent carbon, from about 0.395 to about 0.605 weight percent silicon, from about 1.75 to about 1.95 weight percent manganese, about 0.02 weight percent of phosphorus, about 0.005 percent sulfur, from about 0.02 to about 0.06 weight percent aluminum, less than about 0.06 weight percent copper, less than about 0.04 weight percent nickel, less than about 0.06 weight percent chromium and less than about 0.02 weight percent molybdenum, based on the total weight of the composition.

In accordance with the invention, the steel compositions undergo various processing steps to provide steel materials that are suitable for use in forming rimfire ammunition cartridges. The steel compositions can be obtained or received from a producer in various forms that are known in the art. For example, the steel composition can be received in a hot rolled condition, either as black band (with scale intact; to be pickled or de-scaled, for example, by a customer) or in a pickled and oiled condition. The steel in the hot rolled condition is processed on a hot strip mill which can result in the following initial mechanical properties, for example: about 80 KSI minimum yield strength, about 95 KSI minimum tensile strength and about 10% minimum elongation in 2". Alternatively, the steel as received from the producer can have about 110 KSI yield strength, about 113 KSI tensile strength and about 16% elongation in 2". These steels are commonly used in the hot rolled state and thus, the as-received mechanical properties are desired by the end user, e.g., customer. In certain embodiments, there may be no properties guaranteed or cited by the hot roll producer since the end user will be generating the final properties by its own processing, which includes cold rolling and annealing. Typically, the end user may specify general hot roll parameters relating to finishing and cooling temperatures, such as "high finishing" and "low cooling" temperatures. In other embodiments, steel can be received from the producer in an intermediate gage versus hot rolled. In these embodiments, the steel can be supplied either as cold rolled (hard temper), regular annealed, or dual phase annealed (or other higher strength structure). Intermediate gage steel may be used to shorten the processing steps (designed to fit into the subsequent processing scheme), or to utilize the intermediate properties. Dual phase intermediate steels can have various mechanical properties. In certain embodiments, the dual phase steel can have about 130.8 KSI yield strength, about 165.9 KSI tensile strength and about 10.6% elongation in 2", or about 154 KSI yield strength, about 182 KSI tensile strength and about 9.9% elongation in 2". In any case, the steel as received from the producer is then processed to a finished annealed product for use making rim fire ammunition cartridges.

Figure 3A:
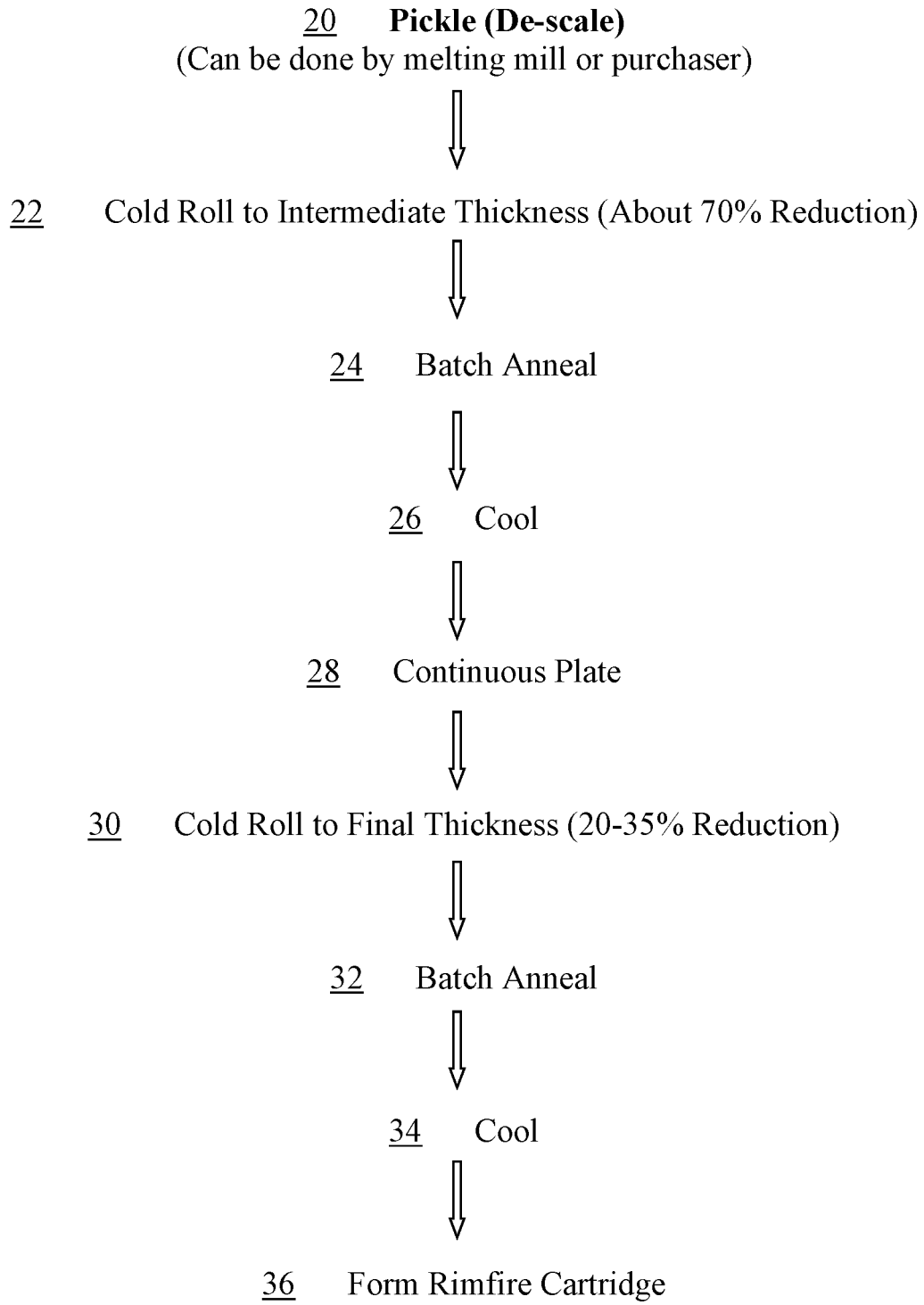
Figure 3B:
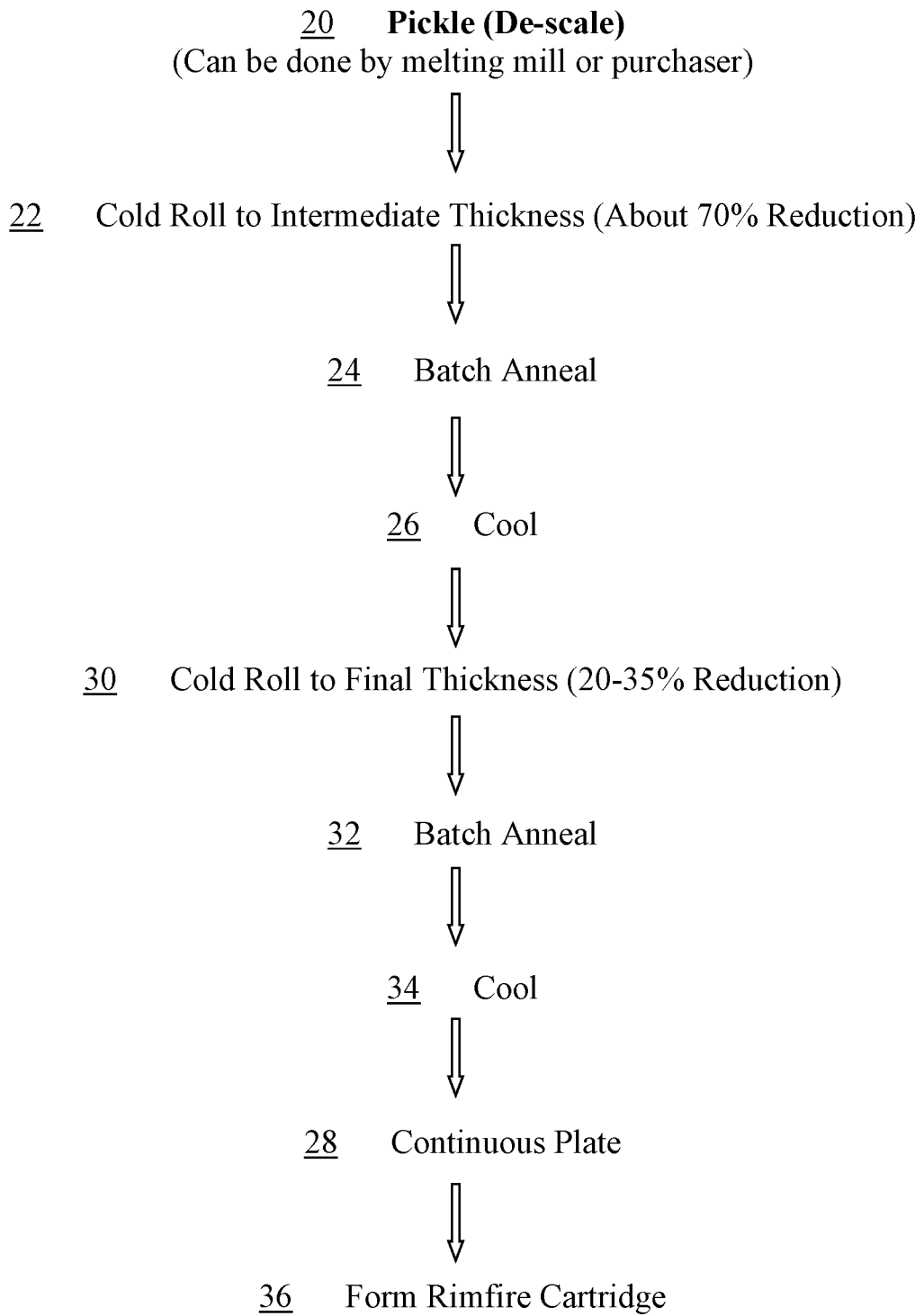

The processing of the steel includes annealing, which can be conducted by employing a batch process or a continuous process. The steel as received (from a producer) and being processed can have the beginning typical mechanical properties, as mentioned above, and is pretreated by the removal of scale and cutting to a width that allows for subsequent processing. FIGS. 3A, 3B and 3C are schematics that show typical steps carried out in the batch annealing process of the steel composition. The process steps in FIGS. 3A and 3B assume that the steel composition as received from the producer has not been processed. That is, the steel composition is in the form of an unprocessed hot roll or hot roll in a pickled and oiled condition. However, it is contemplated and understood that the steel composition as received from the producer may have been processed to an extent and therefore, can be in the form of a partially processed roll. In this situation wherein partial processing has been done by the producer of the received roll, it may be appropriate to modify or eliminate a step in the processes as shown in FIGS. 3A and 3B. For example, the processes shown in FIGS. 3A and 3B begin with pickling (de-scaling) 20 the roll. If the roll is received in a pickled condition, this initial step can be skipped or eliminated. Further, the next step identified in FIGS. 3A and 3B is cold rolling 22 the steel composition to an intermediate thickness that constitutes a reduction of about 70% from the initial thickness of the steel composition. If the steel composition received from the producer, e.g., the starting steel composition, has already been partially processed, it may not be necessary to perform a cold roll reduction of 70%. Thus, this initial cold rolling step 22 can be modified or even eliminated to accommodate the properties and extent of processing of the received steel roll. In one embodiment, the received steel roll can be in the form of a dual phase cold roll which is partially processed such that the cold roll step can be performed to reduce the thickness by about 30% as a minimum (instead of about 70% as recited in FIGS. 3A and 3B). Further, with respect to a received steel roll that is in the form of a dual phase, it may be appropriate to perform an anneal, e.g., batch anneal, prior to the initial cold roll step. This situation involving a received dual phase cold roll is shown in FIG. 3C, which is described later herein.

In accordance with FIGS. 3A and 3B, following the initial cold roll step 22, the steel composition having the intermediate thickness is subjected to an initial or first batch annealing 24 and subsequent cooling 26. In FIG. 3A, these batch annealing and cooling steps 24,26 are followed by continuous plating 28. However, in FIG. 3B, the continuous plating 28 is not conducted until the end of the process, e.g., following a second or final batch annealing 32 and cooling 34 process. It is contemplated and understood that the continuous plating 28 can be conducted according to either of the processes recited in FIGS. 3A and 3B, and additionally, the continuous plating 28 can be conducted according to both of the processes of FIGS. 3A and 3B. That is, the continuous plating 28 can be conducted following the initial or first batch annealing 24 and subsequent cooling 26 process, and following the final or second batch annealing 32 and subsequent cooling 34 process. The continuous plating 28 includes applying or depositing a coating composition to form a layer or coating thereon. The coating can include elemental zinc or zinc alloy, elemental brass or brass alloy, or other protective coating.

Following, the first batch annealing and cooling 24,26 (and optionally plating 28), the steel composition is subsequently subjected to a second cold roll process 30 that reduces the thickness an additional 20-35% to obtain a final thickness, followed by a second or final batch annealing 32 and cooling 34, for producing rim fire cartridges 36 in accordance with conventional techniques.

In certain embodiments, the batch annealing consists of heating the steel to a temperature of about 500° F. for a period of about 0.5 hours. The temperature is then increased to a temperature of about 1,250° F. over a period of 8.5 hours and subsequently, the temperature is increased to a temperature of about 1,300° F. over a period of 1.5 hours and held at this temperature for about 6.0 hours. The steel is then cooled to ambient temperature and plated. Following continuous plating, the steel is further processed by cold rolling to a final thickness, which provides about 20 to about 35% further reduction. Without intending to be bound by any particular theory, it has been found that limiting the additional reduction to the range from about 20 to about 35% produces steel with different physical properties than are typical for the grade of steel. The steel having the final thickness is batch annealed, cooled and then formed into rimfire cartridges.

The batch process described in FIG. 3C shows typical processing steps for using intermediate thickness steel 40, either in the cold rolled state, or dual phase annealed state. FIG. 3C includes an initial or first batch annealing and cooling 42, followed by cold rolling 44 to an intermediate thickness (about 30-70% of the initial thickness), and then another or second batch annealing and cooling 46. Subsequently, a second cold rolling 48 is conducted to provide a final thickness (about an additional 20-35% reduction), followed by another or final batch annealing and cooling 50. As shown in FIG. 3C, continuous plating 52 of the final annealed steel composition is performed such that the steel composition is suitable for use in forming a rimfire cartridge 54. In FIG. 3C, continuous plating is shown as the last step before forming the cartridges. However, as in FIG. 3A, an option is to perform continuous plating 52 after the second batch annealing 46, then cold rolling 48 to a final thickness and subsequently performing the final batch annealing 50.

The processes employed to form the rimfire cartridges can include conventional apparatus and methods known in the art, such as, but not limited to, cup, draw and head processes and progressive die and head processes.

It should be noted that for the processes shown in FIGS. 3A, 3B and 3C, processing can also include rolling directly to gage with no intermediate anneal. In so doing, the propensity for earing is a consideration. If directly rolling from hot band, a high degree of reduction (e.g., in the range of from about 85 to about 88%) may contribute to minimizing earing, depending on the chemistry. This alternative or option is equally applicable to FIG. 4, which is described below.

Figure 4:
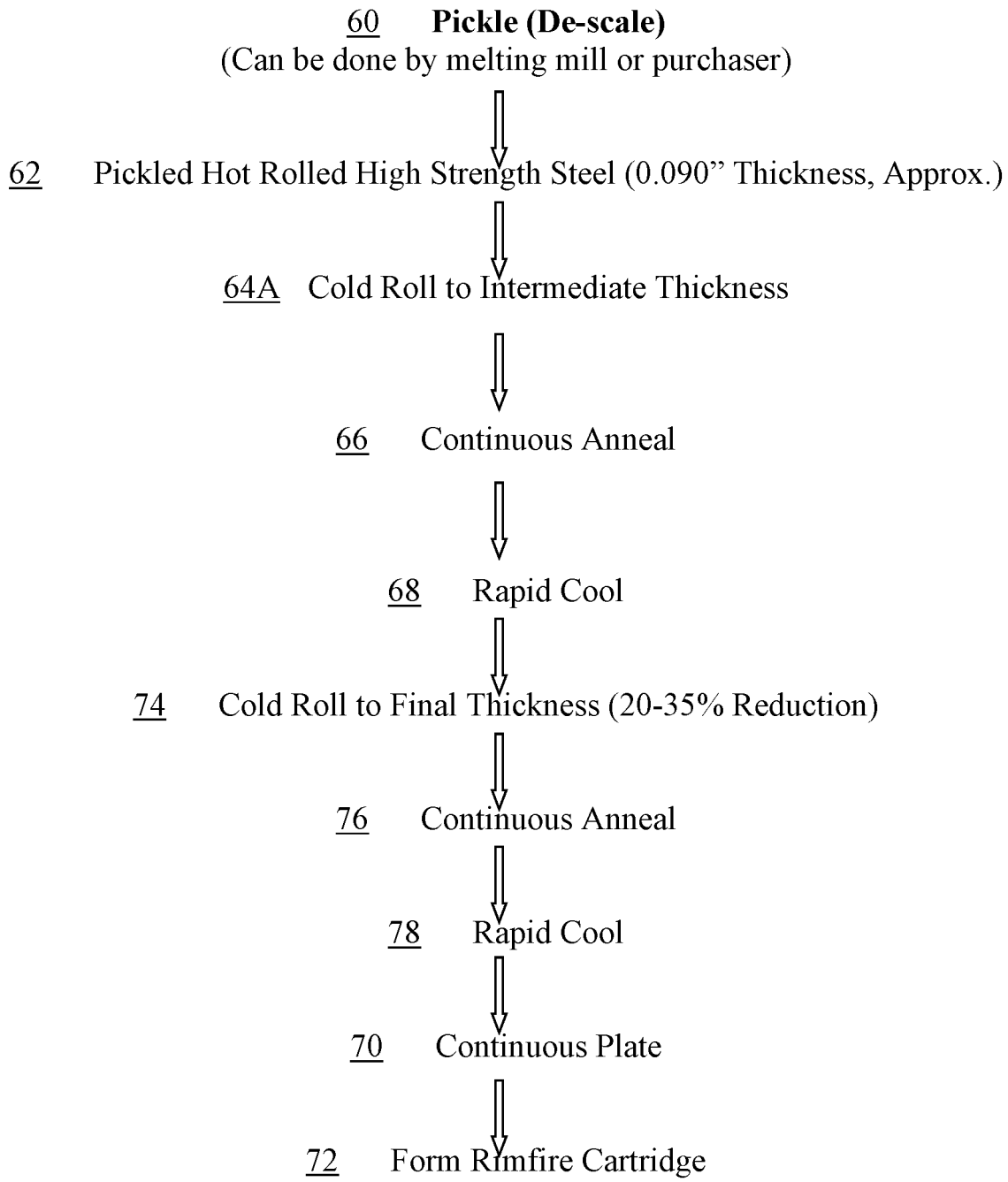
FIG. 4 is a flow diagram for a continuous Process Route #1 and a continuous Process Route #2 in accordance with the invention that is used to treat or process steel and form it into a rimfire cartridge case.

FIG. 4 is a schematic showing the steps that can be conducted in a continuous processing, e.g., annealing, of a steel composition. FIG. 4 identifies a Process Route #1 and a Process Route #2. As shown in FIG. 4, Process Route #1 includes starting with hot rolled high strength steel having a thickness of about 0.090 inch. If the hot roll is not received in a pickled condition, pickling or de-scaling 60 is conducted to produce the pickled hot roll 62 (as identified in FIG. 4 as the initial step). The pickled hot roll 62 is cold rolled 64 to a finished gage or thickness and then, continuous annealing 66 and subsequent rapid cooling 68 are performed, followed by continuous plating 70 with zinc, brass or other protective coating. The resulting processed steel composition is then used to produce rimfire cartridges 72 formed using conventional techniques. Further, as shown in FIG. 4, Process Route #2 includes starting with a pickled hot rolled high strength steel 60,62 having a thickness of about 0.090 inch, as shown in Process Route #1. Further, Process Route #2 includes cold rolling 64A to an intermediate thickness, followed by intermediate continuous annealing 66 and rapid cooling 68, followed by further cold rolling 74 to a final thickness which provides for about 20-35% reduction and then, continuous annealing 76 and rapid cooling 78, followed by continuous plating 70 with zinc, brass or other protective coating. The resulting processed steel composition is then used to produce rimfire cartridges 72 formed using conventional techniques.

In Process Route #1, the temperature of the continuous anneal is typically about 1775° F. The subsequent cool is for about 1-2 minutes to about room temperature, before recoiling at the exit end of the continuous anneal furnace. For the steel composition that includes from about 0.05 to about 0.13 weight percent carbon, from about 0.15 to about 0.50 weight percent silicon, from about 0.70 to about 2.50 weight percent manganese, about 0.025 weight percent phosphorus, about 0.025 percent sulfur, from about 0.02 to about 0.08 weight percent aluminum and less than about 0.22 weight percent of the one or more metal elements, based on the total weight of the composition, the continuous annealed structure produced by Process Route #1 (as shown in FIG. 4) can be comprised of very fine-grained ferrite (ASTM #12-14 approximately), residual carbide particles containing small amounts of V and Cb, and a small volume fraction of martensite in pools formed from partial austenitization at high temperature (and fast cooling in the continuous anneal). The combination of solid solution strengthening from high Mn and Si contents, the very fine grain size, the precipitation hardening effect of the carbide particles, and the presence of the martensitic second phase, all contribute to producing a steel with a very high work-hardening rate, yet relatively low yield strength (comparable to regular low carbon 1008/1010 steel). Typical tensile properties of this steel, cold rolled and heat treated as described above, are as follows:

Yield Strength—40-50 KSI
Tensile Strength—80-100 KSI (typically 88-95 KSI)
Elongation—20-30%

The fact that the tensile strength is almost twice as high as the yield strength, indicates the high work-hardening characteristics of this material. Annealed brass generally shows the same effect, with the tensile strength being about 2 to 2½ times that of the yield strength. This material, when severely ironed in the cartridge sidewall, will produce the high yield strength needed for sufficient elastic recovery (successful extraction) and high enough strength to prevent sidewall splits.

In Process Route #2, the steel is continuously annealed in the range from about 1400 to about 1775° F. to soften the final cold rolling. The final anneal is the same as for Process Route #1, i.e., continuous annealing at about 1775° F. and rapid cooling to approximately room temperature (1-2 minutes) and recoiling at the exit end of the furnace. Process Route #2 can produce a structure virtually identical to the structure produced in Process Route #1 but yields some advantages as further described. Steel processed in the Process Route #1 typically shows a significant degree of earing or planar anistropy (due to preferred crystal orientation). Earing can result in slight non-uniform thickness around the circumference of the cartridge. By using the intermediate anneal step and final thickness reduction in Process Route #2, this earing tendency can be reduced or minimized. In addition, this step may also tend to keep the yield strength toward the low side of the range because of a very slight coarsening of the ferrite grain size. Even though both Process Routes #1 and #2 are effective to produce steel that functions well for rimfire cartridges, steel processed or treated by Process Route #2 may tend to form more consistently due to the minimized earing and slightly less thickness variation around the cartridge circumference.

In certain embodiments, the invention provides treatment of a high strength low alloy steel which includes continuous annealing at high temperatures to produce a dual phase steel. In certain other embodiments, the invention provides treatment of grade 409 or 410 stainless steel, which includes batch processing at lower temperatures. Use of these materials are advantageous in that no corrosion-resistant coating is needed following treatment of the steel.

The treated steel can be produced to minimum earing properties, e.g., similar to the processing of brass. Without intending to be bound by any particular theory, it is believed that this allows for easier manufacturing and more uniformity in the cartridge wall. Further, a coarsening of the grain size may occur, which will produce lower yield strength, e.g., to facilitate rim firing, and a slightly higher work hardening rate when the steel is formed into a cartridge.

The steel can be pre-plated for corrosion resistance to provide extra lubrication for the drawing process, and to minimize tooling wear. Both brass plate and zinc plate with a special clear chromate (for extra protection from white rust with the zinc coat) can be used. Other plating types such as copper, cadmium, nickel, nickel-zinc, or any others which could provide lubrication and are drawable enough for forming, also can be used. However, some of these may be prohibitively expensive.

In certain embodiments, the steel can be plated prior to forming to provide extra lubrication and to reduce tool wear. Alternately, the steel can be plated for corrosion resistance after the ammunition cases are formed.

One having skill in the art will appreciate that the specifications of the annealing process, including the time periods and temperatures, can vary depending on the type of equipment used, among other factors. Alternative annealing parameters may be used that achieve the same result.

EXAMPLES

Testing of Mechanical Properties for Brass and Steel

The mechanical properties in the wall of an existing ammunition cartridge made from brass were determined in order to identify the properties a steel composition should possess to match, or closely approximate, the elastic recovery of brass. Rimfire cartridges are basically drawn and ironed, with mostly ironing in the final forming stages. Since it was essentially impossible to sample the cartridge wall and measure tensile properties, a method to approximate this was necessary. Ironing most closely resembles cold rolling (for the simplest mechanical working process). Sections of cartridge walls were measured for thickness and then, annealed brass strips were cold rolled to the same thickness (the brass cartridge walls after drawing and ironing ranged from about 0.012" to 0.008" from near the cartridge base to the open end and therefore, the same thickness was used for rolling the strips). Since the brass used for rimfire cartridges typically is about 0.020" in thickness, depending on the producer, low carbon steel and the brass plated strips were originally rolled from about 0.020" material. All of the brass and baseline low carbon steel strips were in the normally-used annealed condition (the brass was obtained directly from a cartridge manufacturer, and the steel was standard 1008/1010 low carbon batch annealed steel).

Tensile tests were performed on the cold rolled brass and low carbon steel strips to determine the yield strength, tensile strength and elongation. The results, comparing the brass to the low carbon steel properties, were used to develop special high strength steels having the following compositions: from about 0.03 to about 0.18 weight percent carbon, from about 0.15 to about 1.60 weight percent silicon, from about 0.60 to about 2.50 weight percent manganese, from greater than 0 to about 0.025 weight percent phosphorus, from greater than 0 to about 0.025 weight percent sulfur and from about 0.20 to about 0.08 weight percent aluminum and less than about 0.22 weight percent of the one or more metal elements, based on the total weight of the composition.

After processing the trials of the high strength steels, strip samples were taken and cold rolled to the same, or approximate thicknesses as the brass and low carbon steel for comparison purposes. The results of the cold rolling experiments are shown below in Table 1. Only the yield strengths (in KSI) are shown because this is what was used to determine the elastic recovery.

TABLE 1

| Material | Annealed | @0.012" | @0.10" | @0.008" |
|---|---|---|---|---|
| Cartridge Brass | 21.0 | 78.8 | 83.5 | 89.8 |
| Reg. Low Carbon | 48.0 | 88.1 | 91.5 | 95.7 |
| High Strength, Continuous Annealed | 48.0 | 134.6 | 140.3 | 152.1 |
| High Strength, #1 Batch Annealed | 44.2 | 115.3* | 131.8 | 143.7** |
| High Strength, #2 Batch Annealed | 31.8 | 86.0*** | 105.6 | **** |

*Actual thickness was 0.0134"
**Actual thickness was 0.0094"
***Actual thickness was 0.01275"
**** Rolling mill could not achieve 0.008"

Table 1 shows that yield strength in the brass sidewalls ranged from about 79 to about 90 KSI, while that of the regular low carbon steel was about the same. Due to the difference in elastic modulus between brass and steel, this means that the low carbon steel would "shrink" back half as much as the brass and this is why extraction problems occur when ordinary low carbon steel is used to make cartridges. However, the continuously annealed high strength steel as shown in the Table 1, work-hardens to a range of about 135 to about 142 KSI. Even though this is slightly less than twice that of the brass numbers, test firings of cartridges made of this steel at the manufacturer showed no extraction problems in several gun types including revolvers and semi-automatic pistols. One objective method used to test extraction by the manufacturer, is to fire six cartridges in a revolver and then measure the actual force it takes to "push" all six cartridges out using to manual extractor rod. This was done with some cartridges made from the continuous annealed steel. Brass was fired first for a baseline and in this firing of three gun loads, the results averaged 2.2 lb. force (an empty gun pushed at about 1.5 lb. force). The steel cartridges averaged under 2 lb. force and there were no misfires or sidewall splits. Although, there were a few misfires in some of the other gun types. Thus, in revolver tests, the continuously annealed steel cartridges performed as good as brass. Misfires may occur because the yield strength of brass is significantly less than for the steel. Thus, the firing pin deforms the steel to a lesser extent than the brass and translated less deformation to the primer. To minimize this effect, the primer mixture can be adjusted slightly for sensitivity to deformation, or the steel may be made slightly thinner to allow for more deformation to occur. These rimfire cartridges were made from the cup, draw, and head method, as well as the progressive die and head method, and were zinc-plated.

The results shown in Table 1 for the continuous annealed high strength steel and firing tests with cartridges made from this steel, were obtained by heat treating the steel in accordance with FIG. 4, Process Route #2. This steel has the following composition: from about 0.05 to about 0.10 carbon, from about 0.20 to about 0.50 silicon, less than about 0.07 chromium, from about 0.70 to about 1.45 manganese, from about 0.05 to about 0.14 vanadium, less than about 0.05 nickel, less than about 0.02 phosphorus, from about 0.04 to about 0.12 columbium, less than about 0.03 molybdenum, less than about 0.016 sulfur, from about 0.02 to about 0.08 aluminum, based on the total weight of the composition.

Table 1 shows that High Strength #1, Batch Annealed steel work hardened to levels of about 115 KSI to about 144 KSI, similar to the continuous annealed high strength steel. Yield strength was also close to the continuously annealed steel at about 44 KSI. Rimfire cartridges were manufactured successfully from this steel at a rim fire manufacturing plant and test fired. The same revolver test as previously discussed above was used with these cartridges also. There were significant sidewall splits with some of these cartridges. Upon examination, it appeared that the cracks were emanating from die scratches all around the tops of the cartridges. It should be noted that this steel was supplied in test quantity and was not plated. When the splits did not inhibit the extractor "push", levels of about 2.2 lb. extraction force were measured. Thus, the level of strength in the sidewalls of the cartridges made from this steel, are enough to allow good extraction. It is anticipated that the plating will result in much better lubrication in the draw dies, and this should eliminate the tendency for die scratches. The lubrication normally used for brass, was probably not optimal for bare steel. There were also some misfires in this testing. The discussion of this in the above paragraph also applies with this material. These cartridges were made from the cup, draw and head method.

The results shown in Table 1 for High Strength #1, Batch Annealed steel and firing tests with cartridges made from this steel, were obtained by heat treating the steel in accordance with FIG. 3C. This steel has the following composition: about 0.16 to about 0.18 percent carbon, from about 1.25 to about 1.55 percent silicon, from about 1.9 to about 2.1 percent manganese, about 0.02 percent phosphorus, about 0.02 percent sulfur, about 0.025 to about 0.055 percent aluminum, less than about 0.06 percent copper, less than about 0.04 percent nickel, less than about 0.06 percent chromium and less than about 0.02 percent molybdenum, based on the total weight of the composition.

Table 1 shows that High Strength #2, batch annealed steel work hardened to levels of about 86 KSI to 106 KSI, lower than for High Strength #1, Batch Annealed steel and High Strength Continuous Annealed steel. However, it is noted that the highest level here was for material at 0.010" and not 0.008"; the rolling mill available to roll this material could not achieve 0.008". Extrapolating the data would put the yield at 0.008" at approximately 115-120 KSI. Also, part of the reason for the somewhat lower values is the lower silicon level for High Strength #2, Batch Annealed steel. This chemistry was used in order to obtain a lower value to attempt to determine the lowest yield strength capable of producing cartridges that would extract acceptably, and provide less tendency for misfires (due to the lower as-annealed yield strength). Rimfire cartridges were manufactured successfully from this steel, although a small amount of earing was present. Firing tests with this High Strength #2, Batch Annealed steel were conducted concurrently with the firing tests for High Strength #1 material described above. The brass test firing baseline was 2.2 lb. force for 3 gun loads. The results for High Strength #2, Batch Annealed steel averaged 2.46 lb. force and there were no misfires, so this material was a (perfect) match for the brass. Thus, it has been determined that the yield strength needed in the sidewalls of the rimfire cartridge to allow good extraction, can be significantly lower than twice the level of brass, but these levels can only be achieved with specially selected and processed steels. These cartridges were made by the cup, draw and head method.

The results shown in Table 1 for High Strength #2, Batch Annealed steel and firing tests with cartridges made from this steel, were obtained by processing the steel in accordance with FIG. 3C. This steel has the following composition: from about 0.126 to about 0.154 weight percent carbon, from about 0.395 to about 0.605 weight percent silicon, from about 1.75 to about 1.95 weight percent manganese, about 0.02 weight percent of phosphorus, about 0.005 percent sulfur, from about 0.02 to about 0.06 weight percent aluminum, less than about 0.06 weight percent copper, less than about 0.04 weight percent nickel, less than about 0.06 weight percent chromium and less than about 0.02 weight percent molybdenum, based on the total weight of the composition.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

We claim:

1. A method of processing steel of a rimfire cartridge, the method comprising:
   obtaining a steel composition having an original thickness;
   performing a first cold rolling of the steel composition;
   producing the steel composition having a reduced thickness,
      wherein, the reduced thickness constitutes a reduction of about 70% from the original thickness;
   performing a first batch annealing and subsequent cooling of the steel composition having the reduced thickness;
   performing a second cold rolling of the steel composition having the reduced thickness, following the first batch annealing and subsequent cooling step;
   producing the steel composition having an additional reduced thickness,
      wherein, the additional reduced thickness constitutes an additional reduction of about 20% to about 35%;
   performing a second batch annealing and subsequent cooling of the steel composition having the additional reduced thickness; and
   continuous plating the steel composition having the additional reduced thickness, following the second batch annealing and subsequent cooling step.

2. The method of claim 1, wherein the first and second annealing are conducted as a continuous process.

3. The method of claim 1, wherein the continuous plating comprises depositing an element selected from the group consisting of zinc, brass and combinations and alloys thereof.

4. A method of forming a rimfire cartridge, comprising:
   obtaining a steel composition having an original thickness;
   performing a first cold rolling of the steel composition;
   producing the steel composition having a reduced thickness of about 30% to 70% of the original thickness;
   performing a first batch annealing and subsequently cooling of the steel composition having the reduced thickness;
   performing a second cold rolling of the steel composition having the reduced thickness, following the first batch annealing and subsequent cooling step;
   producing the steel composition having a further reduced thickness of about 20% to 35%;
   performing a second batch annealing and subsequent cooling of the steel composition having the further reduced thickness; and
   continuous plating the steel composition having the further reduced thickness; and
   forming steel composition having the further reduced thickness into a rimfire cartridge.

* * * * *